United States Patent
Kato et al.

(10) Patent No.: US 8,707,307 B2
(45) Date of Patent: Apr. 22, 2014

(54) CREATING JOBS BY REPLACING EXECUTION ATTRIBUTES WITHIN JOB DEFINITION WHEN A JOB ACTIVATION REQUEST IS RECEIVED WITH EXECUTION ATTRIBUTES BASED ON PREDETERMINED CONDITIONS BEING SATISFIED

(75) Inventors: Masashi Kato, Kawasaki (JP); Masahiro Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1098 days.

(21) Appl. No.: 12/335,261

(22) Filed: Dec. 15, 2008

(65) Prior Publication Data
US 2009/0276779 A1    Nov. 5, 2009

(30) Foreign Application Priority Data
Apr. 30, 2008    (JP)    ................ 2008-118103

(51) Int. Cl.
*G06F 9/46* (2006.01)
*G06F 9/44* (2006.01)

(52) U.S. Cl.
USPC ............ 718/100; 718/101; 718/102; 717/104

(58) Field of Classification Search
None
See application file for complete search history.

(56) References Cited

U.S. PATENT DOCUMENTS

| | | | | |
|---|---|---|---|---|
| 6,622,156 B2* | 9/2003 | Hirabayashi | ................. | 718/102 |
| 7,471,405 B2* | 12/2008 | Sabbagh et al. | ............ | 358/1.15 |
| 2005/0028158 A1* | 2/2005 | Ferguson et al. | ............ | 718/100 |
| 2005/0065993 A1* | 3/2005 | Honda et al. | ................. | 709/200 |
| 2007/0229895 A1* | 10/2007 | Fujimori et al. | ............ | 358/1.16 |
| 2007/0240099 A1* | 10/2007 | Jahn et al. | ..................... | 717/104 |
| 2008/0163219 A1* | 7/2008 | Marwinski | ................... | 718/101 |

FOREIGN PATENT DOCUMENTS

| JP | 63-138425 A | 6/1988 |
|---|---|---|
| JP | 5-324279 A | 12/1993 |
| JP | A 11-170667 | 6/1999 |
| JP | 2002-132516 A | 5/2002 |

OTHER PUBLICATIONS

Japanese Office Action mailed Mar. 6, 2012 for corresponding Japanese Application No. 2008-118103, with English-language Translation.

Japanese Office Action mailed Dec. 11, 2012 for corresponding Japanese Application No. 2008-118103, with English-language Translation.

* cited by examiner

*Primary Examiner* — Abdullah Al Kawsar
(74) *Attorney, Agent, or Firm* — Fujitsu Patent Center

(57) ABSTRACT

When there is a job activation request accompanied with variable information in which an execution attribute and an identifier of a job are associated, a job definition in which an execution attribute is described with an arbitrary identifier is referred, and based on the variable information, an identifier within the job definition is replaced with the execution attribute to create a job. Then, the job created in this manner is activated.

9 Claims, 17 Drawing Sheets

FIG. 2

| JOB IDENTIFICATION NAME | AFFILIATION JOB SET NAME | COMMAND /ARGUMENT NAME | ATTRIBUTE 1 (EXECUTION HOST NAME) | ATTRIBUTE 2 (QUEUE NAME) | ATTRIBUTE 3 (OUTPUT FILE NAME) | ...... | ATTRIBUTE n (......) |
|---|---|---|---|---|---|---|---|
| job1 | A-1 | @v1@/cmd1.exe p1 | | @v2@ | | | ...... |
| job2 | A-1 | @v1@/cmd2.exe p1 | | que1 | | | ...... |
| job3 | A-2 | @v1@/cmd2.exe p1 | | @v2@ | @v1@/j3 | | ...... |

FIG. 3

| JOB IDENTIFICATION NAME | AFFILIATION JOB SET NAME | COMMAND /ARGUMENT NAME | ATTRIBUTE 1 (EXECUTION HOST NAME) | ATTRIBUTE 2 (QUEUE NAME) | ATTRIBUTE 3 (OUTPUT FILE NAME) | ...... | ATTRIBUTE n (......) |
|---|---|---|---|---|---|---|---|
| job4 | B-1 | @v1@/cmd4.exe p2 | | | | | ...... |
| ...... | ...... | ...... | ...... | ...... | ...... | | ...... |

FIG. 5

| IDENTIFIER NAME | EXECUTION ATTRIBUTE NAME |
|---|---|
| v1 | /app |

FIG. 6

| IDENTIFIER NAME | EXECUTION ATTRIBUTE NAME |
|---|---|
| .RHOST | hst |

FIG. 7

| IDENTIFIER NAME | EXECUTION ATTRIBUTE NAME |
|---|---|
| v2 | que2 |

FIG. 8

| IDENTIFIER NAME | EXECUTION ATTRIBUTE NAME |
|---|---|
| v2 | que3 |

FIG. 15

| JOB IDENTIFICATION NAME | AFFILIATION JOB SET | COMMAND /ARGUMENT | ATTRIBUTE 1 (REQUEST HOST NAME) | ATTRIBUTE 2 (QUEUE NAME) | ATTRIBUTE 3 (OUTPUT FILE NAME) | ...... | ATTRIBUTE n (......) |
|---|---|---|---|---|---|---|---|
| job1 | A-1 | /app/cmd1.exe p1 | hst | que2 | | | ...... |
| job2 | A-1 | /app/cmd2.exe p1 | hst | que1 | | | ...... |
| job3 | A-2 | /app/cmd2.exe p1 | hst | que3 | /app/j3 | | ...... |

FIG. 16

| JOB IDENTIFICATION NAME | AFFILIATION JOB SET | COMMAND /ARGUMENT | ATTRIBUTE 1 (REQUEST HOST NAME) | ATTRIBUTE 2 (QUEUE NAME) | ATTRIBUTE 3 (OUTPUT FILE NAME) | ...... | ATTRIBUTE n (......) |
|---|---|---|---|---|---|---|---|
| job4 | B-1 | /app/cmd4.exe p2 | ...... | ...... | | | ...... |
| ...... | ...... | ...... | | | ...... | | ...... |

CREATING JOBS BY REPLACING EXECUTION ATTRIBUTES WITHIN JOB DEFINITION WHEN A JOB ACTIVATION REQUEST IS RECEIVED WITH EXECUTION ATTRIBUTES BASED ON PREDETERMINED CONDITIONS BEING SATISFIED

CROSS-REFERENCE TO RELATED APPLICATION

This application is based upon and claims the benefit of priority of the prior Japanese Patent Application No. 2008-118103, filed on Apr. 30, 2008, the entire contents of which are incorporated herein by reference.

FIELD

The embodiment discussed herein is directed to technology for managing various types of jobs.

BACKGROUND

A job management apparatus that systematically activates various types of jobs, such as batch processing or system automatic operation processing, on various kinds of business servers is known. In this job management apparatus, after previously statically defining the job and the execution attributes thereof, a defined job can be activated in response to, for example, an occurrence of event, such as arrival of a given time, notification of a preceding process completion, or the like, and a activating instruction provided by an users operation of a graphical user interface (GUI) or the like. Furthermore, for the command for a job to be activated, a technique to apply an argument from the outside has been proposed, as disclosed in Japanese Laid-open Patent Publication No. 11-170667.

Incidentally, as an operation of the various types of business servers, for example for system maintenance, changing of the execution host for the job and changing of the output of the job result file are performed. In the conventionally proposed technique, it is possible to apply the argument of the command from the outside, however it is not possible to change the execution attributes that prescribes how to execute the job under which conditions. Therefore when system maintenance is performed, it is necessary to temporarily change the statically defined job, so that the workload might be large, and also there is concern that a human mistake such as a definition error might be introduced.

SUMMARY

According to an aspect of the embodiment, when a job activation request accompanied with variable information associated with a job execution attribute and an identifier is made, a job definition in which the execution attribute is described with an arbitrary identifier is referenced. Then, based on the variable information, the identifier within the job definition is replaced with the execution attribute to create a job. Then, the job created in this manner is activated.

Additional objects and advantages of the embodiment will be set forth in part in the description which follows, and in part will be obvious from the description, or may be learned by practice of the embodiment. The object and advantages of the embodiment will be realized and attained by means of the elements and combinations particularly pointed out in the appended claims.

It is to be understood that both foregoing general description and the following detailed description are exemplary and explanatory only and are not restrictive of the embodiment, as claimed.

BRIEF DESCRIPTION OF DRAWINGS

FIG. 2 is an explanatory diagram of a job definition file for a job set A that has been statically defined;
FIG. 3 is an explanatory diagram of a job definition file for a job set B that has been statically defined;
FIG. 5 is an explanatory diagram of a variable information file for an overall job set;
FIG. 6 is an explanatory diagram of a variable information file for a job set A;
FIG. 7 is an explanatory diagram of a variable information file for a job set A-1;
FIG. 8 is an explanatory diagram of a variable information file for a job set A-2;
FIG. 15 is an explanatory diagram of a newly created job for the job set A;
FIG. 16 is an explanatory diagram of a newly created job for the job set B.

DESCRIPTION OF EMBODIMENT

Figure 1:
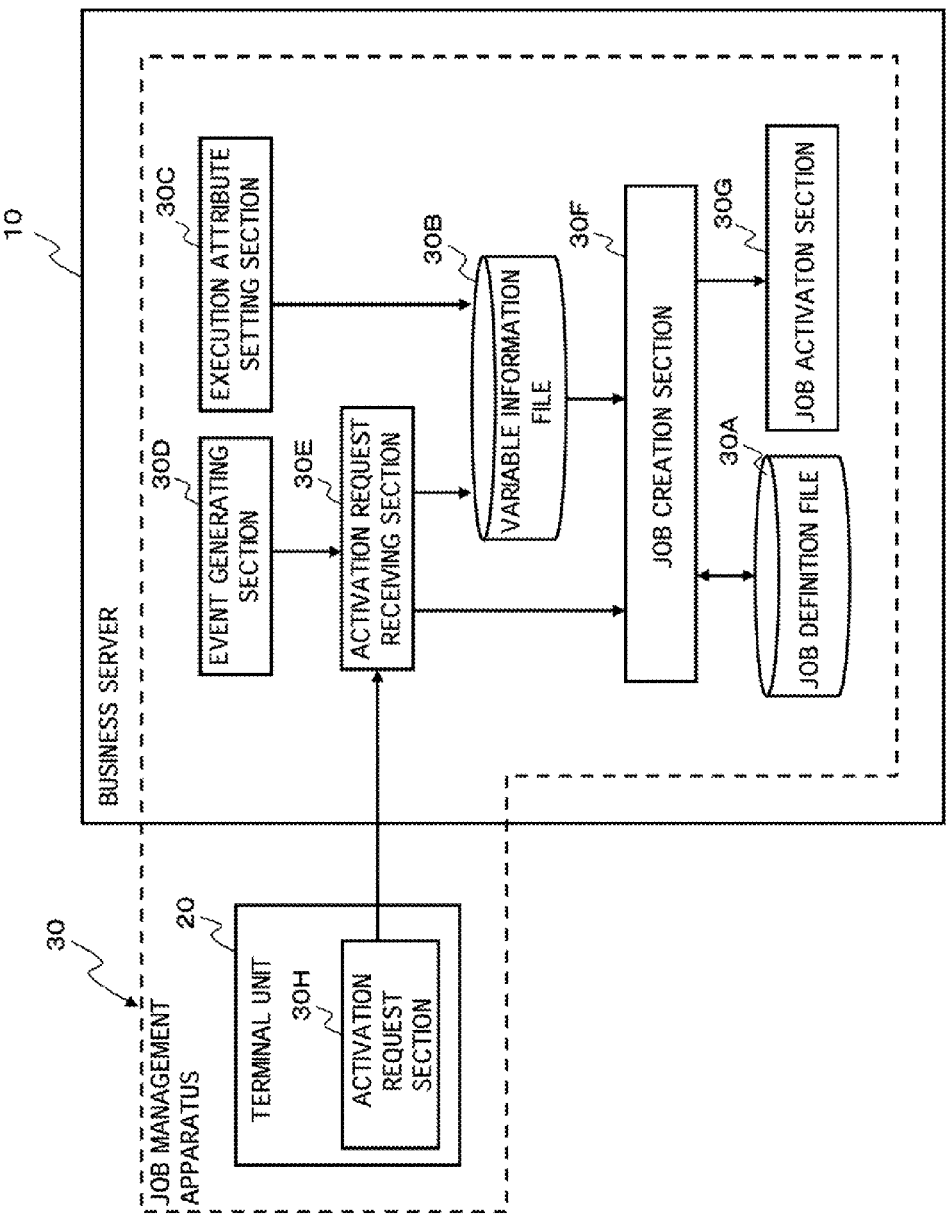
FIG. 1 is a block diagram illustrating an embodiment of a job management apparatus.

FIG. 1 shows an embodiment of a job management apparatus.

A business server 10 and a terminal unit 20, each of which comprises a general purpose computer, execute a job management program installed on a hard disk or the like, to thereby construct a job management apparatus 30 provided with respective parts for providing various functions. The business server 10 is provided with a job definition file 30A and a variable information file 30B, serving as storage media, and by executing a job management program for the server, an execution attribute setting section 30C, an event generating section 30D, an activation request reception section 30E, a job creation section 30F and a job activation section 30G are each implemented. On the other hand, in the terminal unit 20, by executing a job management program for the terminal, an activation request section 30H is implemented. Moreover, the job creation section 30F and the job activation section 30G function respectively as job creation means and job activation means.

The job definition file 30A is a file for storing a statically defined job for performing batch processing or system automatic operation processing or the like, on the business server 10, and is provided for each job set which has been arbitrarily grouped as shown in FIG. 2 and FIG. 3. For each job, as the execution attribute thereof, there are described: a "job identification name" capable of uniquely identifying a job; an "affiliation job set name" indicating the set to which a job belongs; a "command/argument name" indicating a command (application) for executing a job, and an argument thereof; and an "attribute 1-$n$" (where n is a natural number). Here the attribute 1-$n$ indicates various attribute information for executing the job. For example, the attribute 1-$n$ indicates an execution host name for executing a job, a queue name for multiplicity control, an output file name indicating a job result output destination, and the like, are supposed. Furthermore, for the execution attribute of each job, there is set an identifier that indicates that the execution attribute is a variable attribute which is changed by an execution attribute applied from outside. The identifier is set when the job is defined. For example, such an identifier that is expressed by "@xx@" format, or that is previously reserved (a name starting with a dot) or the like is used. As an identifier that is previously reserved, for example ".RHOST" indicating an execution host name, ".POSTPARAM" indicating a variable argument that is added behind a statically defined command argument, or the like, are used.

Figure 4:
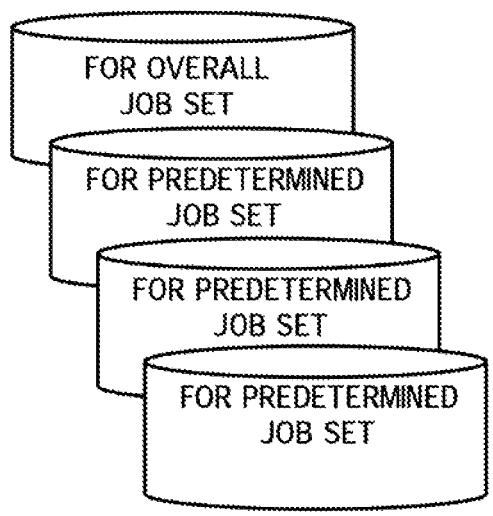
FIG. 4 is an explanatory diagram of a specific configuration of a variable information file.

The variable information file 30B defines rewriting of the variable attributes of the respective jobs stored in the job definition file 30A, with arbitrary execution attributes. Furthermore, the variable information file 30B, as shown in FIG. 4, is broadly classified into a file "for overall job set" in which the overall job is the object, and a file "for specific job set" in which only the jobs belonging to an arbitrarily grouped specific set are the object. In the respective variable information files 30B, as shown in FIG. 5 through FIG. 8, there is described the variable information in which an "identifier name" specifying an identifier of the variable information, and an "execution attribute name" specifying how to replace the identifier, are associated. The variable information file 30B shown in FIG. 5 through FIG. 8 indicates for overall job set, for job set A, for job set A-1, and for job set A-2, respectively.

Figure 9:
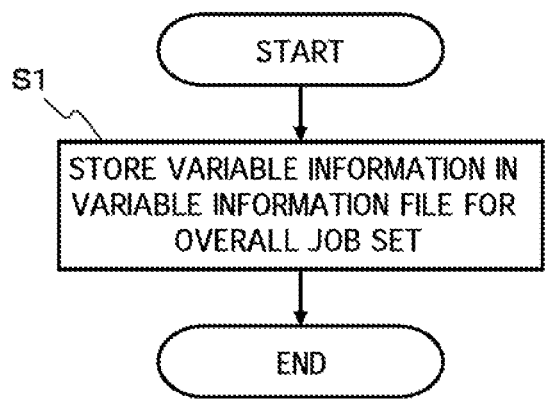
FIG. 9 is a flowchart for explaining execution attribute setting processing.

In the execution attribute setting section 30C, in order to set the execution attributes all together for an overall job set, the execution attribute setting processing shown in FIG. 9 is executed in response to a clear instruction from the operator.

In step 1, (abbreviated to "S1" in the figure, and similarly thereafter) the variable information (i.e., the identifier name and the execution attribute name that are associated to each other) input via the command-line user interface (CUI) or the like, are stored in the variable information file 30B for the overall job set. At this time, if the same identifier name is already stored in the variable information file 30B for the overall job set, the execution attribute name that has been associated to this is overwritten with the newly input execution attribute name. Before performing the overwriting of the variable information in the variable information file 30B for the overall job set, the operator may be asked as to whether or not this is possible.

Figure 10:
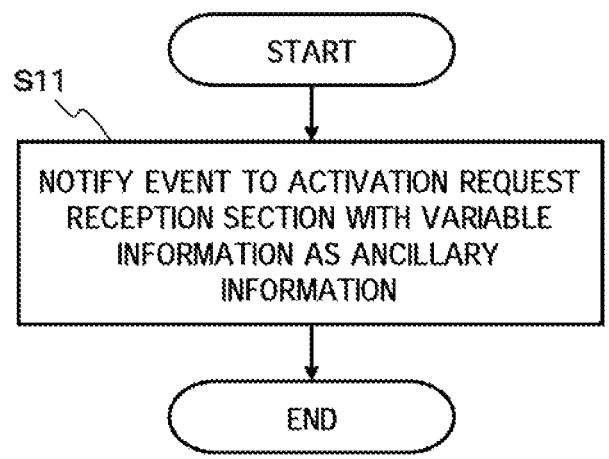
FIG. 10 is a flowchart for explaining event generation processing.

In the event generating section 30D, in order to activate a job stored in the job definition file 30A, the event generation processing shown in FIG. 10 is executed when predetermined conditions that have been set beforehand by the operator are satisfied, specifically, in response to arrival of a given time, notification of a preceding process completion, or the like.

In step 11, with the variable information corresponding to the predetermined conditions as ancillary information, an event serving as an activation request is notified to the activation request reception section 30E.

Figure 11:
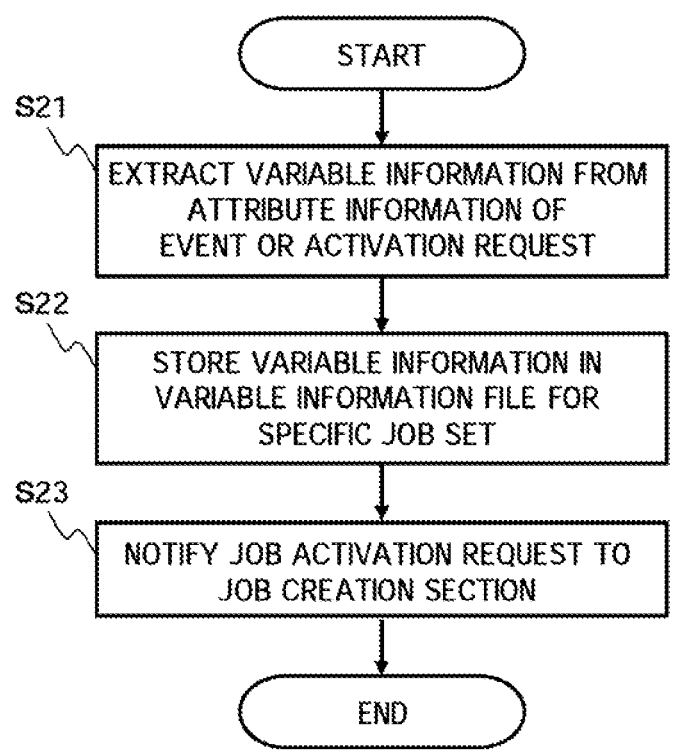
FIG. 11 is a flowchart for explaining activation request reception processing.

In the activation request reception section 30E, when the event notified from the event generating section 30D is received or when an activation request notified from a later mentioned activation request section 30H is received, the activation request reception processing shown in FIG. 11 is executed. In the activation request reception processing, for a job set which becomes an object to be activated, the variable information accompanying the event or the activation request is stored in the variable information file 30B, and a job activation request is notified to the job creation section 30F.

In step 21, the variable information is extracted from the ancillary information of the event or the activation request.

In step 22, in the variable information file 30B for the specific job set specified by the extracted variable information, the extracted variable information is stored. At this time, if the same identifier name is already stored in the variable information file 30B for the specific job set, the execution attribute name that has been associated with this is overwritten with the newly input execution attribute name. Before performing the overwriting of the variable information in the variable information file 30B for the specific job set, the operator may be asked as to whether or not this is possible (and similarly hereunder).

In step 23, the job activation request is notified to the job creation section 30F.

Figure 12:
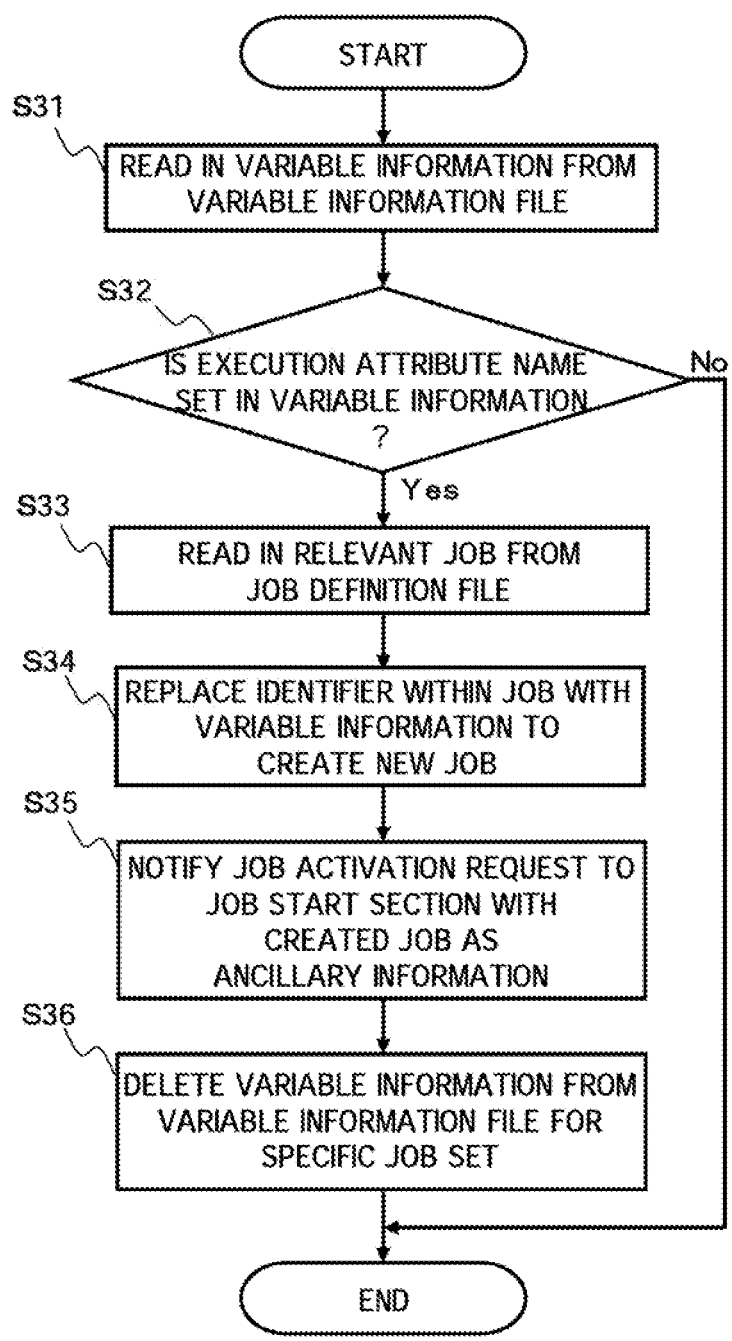
FIG. 12 is a flowchart for explaining job creation processing.

In the job creation section 30F, in order to replace the identifier for the job stored in the job definition file 30A with a specific execution attribute, the job creation processing shown in FIG. 12 is executed in response to the notification of the job activation request from the activation request reception section 30E.

In step 31, with the specific job set specified by the job activation request as an object, the pertinent variable information is read in from the variable information file 30B. At this time, if more than one variable information which are identical with each other are stored in the variable information file 30B, the one with a small job set is preferentially read in.

In step 32, it is determined whether or not an execution attribute name is set in the variable information. This is because, if an execution attribute name is not set in the variable information, an identifier within the job stored in the job definition file 30A cannot be rewritten, and thus in this step, it is judged whether or not there is concern that an error may be generated due to activating the job. Then, if the execution attribute name is set in the variable information, control proceeds to step 33 (Yes), while if the execution attribute is not set in the variable information, the job creation processing is terminated (No).

In step 33, the job of the specific job set specified by the job activation request is read in from the job definition file 30A.

In step 34, based on the variable information read in from the variable information file 30B, a new job in which the identifier within the job of the specified job set has been replaced with a specific execution attribute name is created.

In step 35, with the newly created job as the ancillary information, a job activation request is notified to the job activation section 30G.

In step 36, the variable information associated with the job activation request is deleted from the variable information file 30B for the specific job set.

Figure 13:
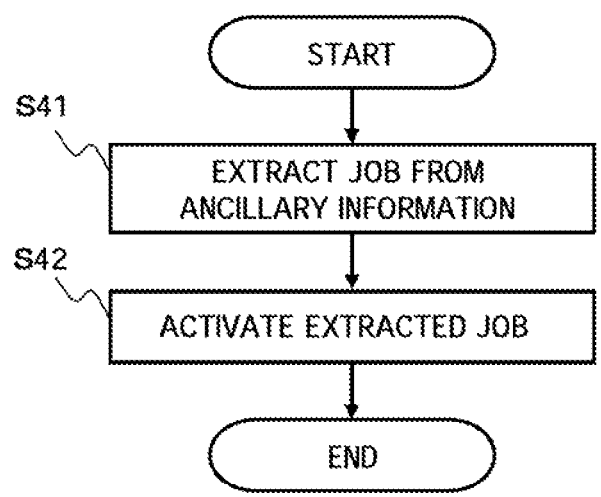
FIG. 13 is a flowchart for explaining job activation processing.

In the job activation section 30G, in order to activate the newly created job, the job activation processing shown in FIG. 13 is executed in response to the notification of the job activation request from the job creation section 30F.

In step 41, the job is extracted from the ancillary information of the job activation request.

In step 42, the extracted job is activated.

Figure 14:
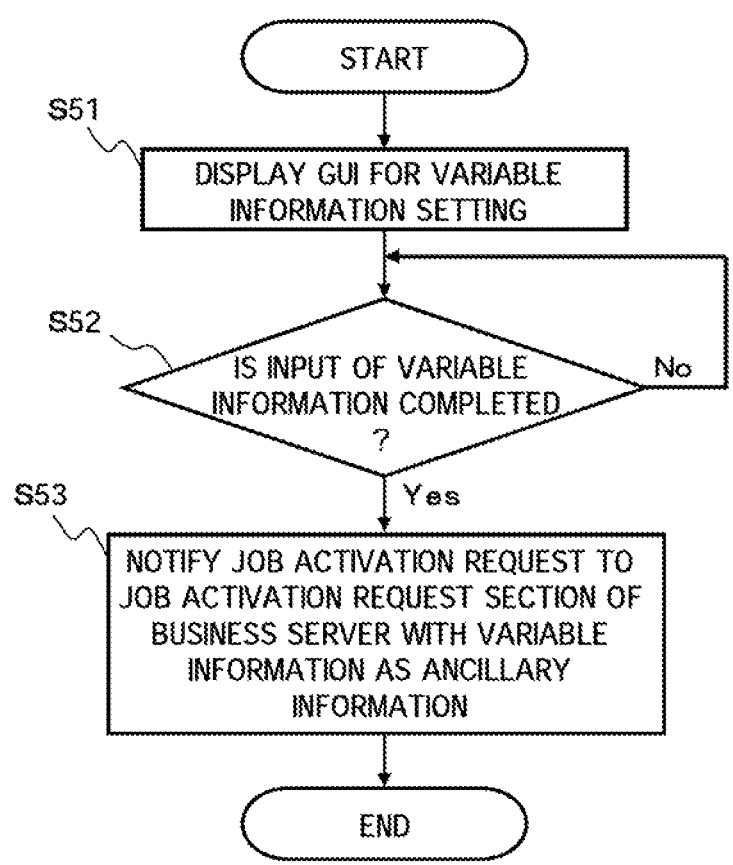
FIG. 14 is a flowchart for explaining activation request processing.

In the activation request section 30H of the terminal unit 20, in order to activate the job while setting the execution attributes of a specific job set altogether, the activation request processing shown in FIG. 14 is executed in response to a clear instruction from the operator.

In step 51, the GUI for setting the variable information is displayed on the monitor of the terminal unit 20. In the GUI for setting variable information, an operation for associating an identifier name within a job with a specific execution attribute name is performed.

In step 52, for example through whether or not a "job activation" button is pressed down in the GUI, it is determined whether or not input of the variable information is completed. Then, if the input of the variable information is completed, control proceeds to step 53 (Yes), while if the input of the variable information is not completed, control stands by (No). Here, a configuration in which when a "cancel" button in the GUI is pressed down, the activation request processing is cancelled, may be employed.

In step 53, with the input variable information as the ancillary information, the job activation request is notified to the activation request reception section 30E of the business server 10.

According to the job management apparatus 30, when setting the execution attributes of the overall job set altogether, if the variable information is input by using the CUI or the like in the job management apparatus 30, the input variable information is stored in the variable information file 30B for the overall job set. At this time, if the same identifier name is already stored in the variable information file 30B for the overall job set, it can be considered that there is an intention to update the variable information. Therefore the variable information is overwritten and updated. Furthermore, before overwriting and updating the variable information, if the operator is asked as to whether or not this is possible, updates due to unexpected operation mistakes can be prevented.

Moreover, when predetermined conditions such as arrival of a given time, notification of a preceding process completion, or the like, are satisfied, or when a clear activation command from the operator is made in the terminal unit 20, the event or the activation request is notified from the event generating section 30D or the activation request section 30H, to the activation request reception section 30E. At this time, variable information corresponding to the predetermined conditions is included in the ancillary information of the event, and also variable information input by the operator via the GUI for setting variable information, is included in the ancillary information of the activation request. Then, in the activation request reception section 30E which has received the event or the activation request, the variable information is extracted from the ancillary information of the event or the activation request, so that the variable information is stored in the variable information file 30B for the specific job set specified by the extracted variable information, and also the job activation request is notified to the job creation section 30F.

On the other hand, in the job creation section 30F that has received the job activation request, with the job set specified by the job activation request as an object, a new job in which the identifier of the job stored in the job definition file 30A is replaced with the specific execution attribute is created. In the followings, there will be described a specific example. In the case where there is a job that is statically defined as shown in FIG. 2 and FIG. 3, the identifier expressed by "@v1@" in all of the jobs is replaced with "/app" based on the variable information for the overall job set shown in FIG. 5. Furthermore, based on the variable information for job set A shown in FIG. 6, the attribute 1 of the job belonging to the job set A is replaced with "hst". Moreover, based on the variable information for the job sets A-1 and A-2 shown in FIG. 7 and FIG. 8, the identifiers represented by "v2" in the jobs belonging to the job sets A-1 and A-2 are respectively replaced with "que2" and "que3". Then finally, the jobs for the job sets A and B as shown in FIG. 15 and FIG. 16 are newly created. Thereafter, with the newly created jobs as the ancillary information, the job activation request is notified from the job creation section 30F to the job activation section 30G. The variable information for the specific job set is temporary information which occurs in response to the job activation request, accordingly, after notifying the job activation request to the job activation section 30G, this variable information is deleted from the variable information file 30B.

Figure 17:
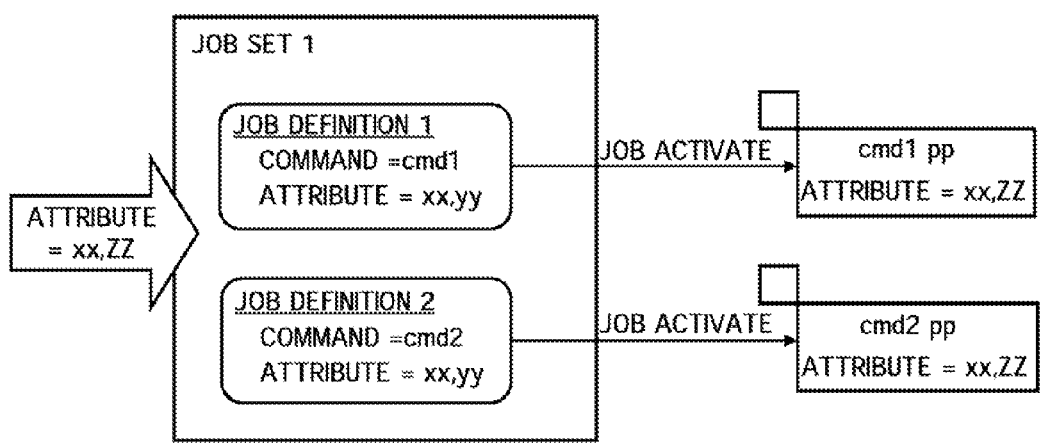
FIG. 17 is an explanatory diagram illustrating the results where an execution attribute for a job is applied from the outside.

Accordingly, as shown in FIG. 17, it is possible to apply the job execution attribute from the outside, so that even if a statically defined job is not temporarily changed, the execution attribute can be easily and safely changed for example for system maintenance. Therefore, in changing the execution attribute of the job, the workload can be reduced, and also the possibility of entering a human mistake such as a definition error can be reduced. Furthermore, for a similar job that differs only in the execution attribute of one part, since this can be achieved even without an individual definition, the number of definitions for the job can be reduced.

Moreover, for a job belonging to a job set that is arbitrarily grouped, since the execution attributes can be changed altogether, then compared to the case where the job belonging to the job set is separately defined, definition errors can be suppressed. At this time, a change of the job execution attribute is performed in units of arbitrary job sets, and hence this can be performed easily and safely.

In addition, since the job activation request is generated when the predetermined conditions set by the operator are satisfied, or when a clear job activation instruction is given by the operator, then for example, it is possible to easily deal with not only job automatic operation processing, but also system maintenance.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory recording medium storing a job management program that when executed by a processor causes a computer to perform a process, the process comprising:

referring, when there is a job activation request received based on predetermined conditions being satisfied accompanied with a variable information in which an execution attribute and an identifier of the execution attribute of a job are associated, to a job definition in which the execution attribute is described with an arbitrary identifier and to the variable information;

creating a job based on the execution attribute received with the activation request by replacing an execution attribute associated with an identifier within the job definition;

activating the created job; and temporarily storing, when there is a job activation request accompanied with the variable information in which the execution attribute and the identifier of the execution attribute of the job are associated with an arbitrary grouped specific job set as an object, the variable information in a storage medium, wherein the referring refers to the variable information stored in the storage medium, and with all of the jobs belonging to the specific job set as an object, and the creating creates a job based on the execution attribute stored in the variable information in the storage medium by replacing the execution attribute associated with the identifier within the job definition, wherein when the variable information is read in from the variable information stored in the storage medium with the specific job set specified by the job activation request, if more than one variable information which are identical with each other are stored in the variable information stored in the storage medium, the variable information with a small job set is preferentially read in.

2. The computer-readable, non-transitory recording medium storing a job management program according to claim 1, the process further comprising:

storing, when variable information in which an execution attribute and an identifier of a job are associated is set by an operator, with an overall job set comprising all of the jobs as an object, the variable information in a storage medium, wherein the referring refers to the variable information stored in the storage medium, and with all of the jobs belonging to the overall job set as an object, and the creating creates a job based on the execution attribute according to an identifier within the job definition.

3. The computer-readable, non-transitory recording medium storing a job management program according to claim 1, the process further comprising:

generating, when the predetermined conditions are satisfied, a job activation request accompanied with variable information corresponding to the predetermined conditions; and generating, when a clear instruction of job activation is given by an operator, a job activation request accompanied with variable information input by the operator, wherein the predetermined conditions are set by an operator.

4. A job management method executed by a computer, the method comprising:

referring to a job definition in which an execution attribute is described with an arbitrary identifier and to variable information in which the execution attribute and an identifier of the execution attribute of a job are associated, when there is a job activation request received based on predetermined conditions being satisfied accompanied with the variable information having the execution attribute and the identifier of the execution attribute of the job associated, thereby creating a job based on the execution attribute received with the activation request by replacing the execution attribute associated with the identifier within the job definition;

activating the created job; and temporarily storing, when there is a job activation request accompanied with variable information in which the execution attribute and the identifier of the execution attribute of the job are associated with an arbitrary grouped specific job set as an object, the variable information in a storage medium, wherein the referring refers to the variable information stored in the storage medium, and with all of the jobs belonging to the specific job set as an object, the creating creates a job based on the execution attribute stored in the variable information in the storage medium by replacing the execution attribute associated with the identifier within the job definition, wherein when the variable information is read in from the variable information stored in the storage medium with the specific job set specified by the job activation request, if more than one variable information which are identical with each other are stored in the variable information stored in the storage medium, the variable information with a small job set is preferentially read in.

5. The job management method according to claim 4, the method further comprising:

storing variable information in which an execution attribute and an identifier of a job are associated to a variable information stored in the storage medium, when the variable information is set by an operator, with an overall job set comprising all of the jobs as an object, wherein the referring refers to the variable information, and the creating creates a job based on the execution attribute according to an identifier within the job definition, with all of the jobs belonging to the overall job.

6. The job management method according to claim 4, the method further comprising:

storing variable information in which an execution attribute and an identifier of a job are associated to a variable information stored in the storage medium, when there is a job activation request accompanied with the variable information, with an arbitrary grouped specific job set as an object, wherein the referring refers to the variable information, and the creating creates a job based on the execution attribute according to an identifier within the job definition, with all of the jobs belonging to the specific job set.

7. The job management method according to claim 4, the method further comprising:

generating a job activation request accompanied with variable information corresponding to the predetermined conditions when predetermined conditions that have been set by an operator are satisfied.

8. The job management method according to claim 4, the method further comprising:

generating a job activation request accompanied with variable information input by the operator when an instruction of job activation is given by an operator.

9. A job management apparatus comprising:

a non-transitory storage medium that stores a job definition in which an execution attribute of a job is described with an arbitrary identifier and stores a variable information in which the execution attribute and an identifier of the execution attribute of a job are associated, wherein the job management apparatus executes a method, the method including:

referring to the job definition and the variable information stored in the storage medium, when there is a job activation request received based on predetermined conditions being satisfied accompanied with the variable information having the execution attribute and the identifier of the execution attribute of the job associated, thereby creating a job based on the execution attribute received with the activation request by replacing the execution attribute associated with the identifier within the job definition; and activating the created job; and temporarily storing, when there is a job activation request accompanied with variable information in which the execution attribute and the identifier of the execution attribute of the job are associated with an arbitrary grouped specific job set as an object, the variable information in a storage medium, wherein the referring refers to the variable information stored in the storage medium, and with all of the jobs belonging to the specific job set as an object, the creating creates a job based on the execution attribute stored in the variable information in the storage medium by replacing the execution attribute associated with the within the job definition, wherein when the variable information is read in from the variable information stored in the storage medium with the specific job set specified by the job activation request, if more than one variable information which are identical with each other are stored in the variable information stored in the storage medium, the variable information with a small job set is preferentially read in.

* * * * *